US012076733B2

(12) United States Patent
Beranger et al.

(10) Patent No.: US 12,076,733 B2
(45) Date of Patent: Sep. 3, 2024

(54) FLUID PRODUCT DISPENSING HEAD

(71) Applicant: APTAR FRANCE SAS, Le Neubourg (FR)

(72) Inventors: Stephane Beranger, Surtauville (FR); Frederic Duquet, Crespieres (FR)

(73) Assignee: APTAR FRANCE SAS, Le Neubourg (FR)

(*) Notice: Subject to any disclaimer, the term of this patent is extended or adjusted under 35 U.S.C. 154(b) by 856 days.

(21) Appl. No.: 16/764,232

(22) PCT Filed: Nov. 30, 2018

(86) PCT No.: PCT/FR2018/053068
§ 371 (c)(1),
(2) Date: May 14, 2020

(87) PCT Pub. No.: WO2019/106319
PCT Pub. Date: Jun. 6, 2019

(65) Prior Publication Data

US 2020/0391229 A1 Dec. 17, 2020

(30) Foreign Application Priority Data

Dec. 1, 2017 (WO) ................. PCT/FR2017/053344
Mar. 9, 2018 (FR) ....................................... 1852087

(51) Int. Cl.
*B05B 1/14* (2006.01)
*B05B 1/26* (2006.01)
(Continued)

(52) U.S. Cl.
CPC .................. *B05B 1/14* (2013.01); *B05B 1/26* (2013.01); *B05B 7/0892* (2013.01); *B05B 11/10* (2023.01);
(Continued)

(58) Field of Classification Search
CPC .. B05B 1/14; B05B 1/26; B05B 11/10; B05B 11/1042; B05B 7/0892; B05B 7/0807; B05B 7/0846; B65D 83/753
(Continued)

(56) References Cited

U.S. PATENT DOCUMENTS 2,647,800 A * 8/1953 Burnam ................. A62C 31/05 239/543
3,934,641 A * 1/1976 Chielens ............ B22D 11/1246 239/433
(Continued)

FOREIGN PATENT DOCUMENTS

GB 2466631 A 7/2010
JP 59-206064 A 11/1984
WO 93/23174 A1 11/1993

OTHER PUBLICATIONS

International Search Report for PCT/FR2018/053068, dated Apr. 17, 2019.
(Continued)

*Primary Examiner* — Steven J Ganey
(74) *Attorney, Agent, or Firm* — Sughrue Mion, PLLC

(57) ABSTRACT

A fluid dispenser head including a spray wall (1) that defines a central axis (X) and that is perforated with holes (O1, O2) through which the fluid under pressure passes so as to form jets of fluid, the holes (O1, O2) extend along axes (Y1, Y2) that correspond to the path of the jets of fluid;

the dispenser head being characterized in that at least some of the axes (Y1, Y2) intersect, such that the jets of fluid that extend along the intersecting axes (Y1, Y2) meet at at least one collision point (P).

12 Claims, 2 Drawing Sheets

(51) Int. Cl.
*B05B 7/08* (2006.01)
*B05B 11/10* (2023.01)
*B65D 83/14* (2006.01)

(52) U.S. Cl.
CPC ........ *B05B 11/1042* (2023.01); *B65D 83/753* (2013.01)

(58) Field of Classification Search
USPC ....... 239/333, 337, 543–545, 552, 596, 601, 239/556–562
See application file for complete search history.

(56) References Cited

U.S. PATENT DOCUMENTS 4,013,227 A * 3/1977 Herrera .................. F23D 14/52 239/544
5,080,286 A * 1/1992 Morrison ................ B05B 1/323 239/543
5,540,200 A * 7/1996 Naitoh ............... F02M 61/1826 239/543
6,158,674 A * 12/2000 Humphreys ........ B05B 11/1001 239/559
2015/0211462 A1* 7/2015 Schnobrich ........ F02M 61/1853 239/561
2015/0330348 A1* 11/2015 Mulye ................ F02M 61/1813 239/562

OTHER PUBLICATIONS

International Preliminary Report on Patentability issued from the International Bureau in International Application No. PCT/FR2018/053068, mailed on Jun. 4, 2020.

* cited by examiner

FLUID PRODUCT DISPENSING HEAD

CROSS REFERENCE TO RELATED APPLICATIONS

This application is a National Stage of International Application No. PCT/FR2018/053068 filed Nov. 30, 2018, claiming priority based on International Patent Application No. PCT/FR2017/053344 filed Dec. 1, 2017 and French Patent Application No. 1852087 filed Mar. 9, 2018.

The present invention relates to a fluid dispenser head for associating with a dispenser member, such as a pump or a valve. The dispenser head may be integrated in, or mounted on, the dispenser member. The dispenser head may include a bearing surface such that it constitutes a pusher on which the user presses so as to actuate the dispenser member. In a variant, the dispenser head need not have a bearing surface. This type of fluid dispenser head is frequently used in the fields of perfumery, cosmetics, and pharmacy.

A conventional dispenser head, e.g. of the pusher type, comprises:

- a bearing surface on which a user can press with a finger, e.g. the index finger;
- an inlet well for connecting to an outlet of a dispenser member, such as a pump or a valve;
- an axial assembly housing in which there extends a pin defining a side wall and a front wall; and
- a cup-shaped nozzle comprising a substantially-cylindrical wall having an end that is closed by a spray wall that forms a spray orifice, the nozzle being assembled along an axis X in the axial assembly housing, with its cylindrical wall engaged around the pin, and its spray wall in axial abutment against the front wall of the pin.

In general, the inlet well is connected to the axial assembly housing via a single feed duct. In addition, it is common to form a swirl system in the spray wall of the nozzle. A swirl system conventionally comprises a plurality of tangential swirl channels that open out into a swirl chamber that is centered on the spray orifice of the nozzle. The swirl system is disposed upstream from the spray orifice.

Document EP 1 878 507 A2 describes several embodiments of a nozzle including a spray wall that is perforated with a plurality of spray holes that are substantially or completely identical in diameter, lying in the range about 1 micrometer (μm) to about 100 μm, with a tolerance of 20%. Such a spray wall generates a spray having a droplet size that is relatively uniform. In an embodiment of that document, the holes are arranged in concentric circles, with a slope lying in the range about 10° to about 60° and at an orientation that is tangential, so as to create a swirl spray around the central axis. In another embodiment, the spray wall is plane and the holes are parallel. In yet another embodiment, the wall is dome-shaped and the holes diverge.

In document EP 1 698 399 A1, the spray wall is dome-shaped, but the holes are perforated perpendicularly to the plane of the wall and with a constant section, while the wall is still plane. Once the wall is dome-shaped, the curvature of the wall serves to make the holes diverge. In that document, it is not explained how, nor at what moment, the perforated plane wall is shaped into a dome.

In both of those documents, the holes generate jets of fine droplets and each jet follows its own path until the droplets are dispersed as a cloud.

An object of the present invention is to define a plane spray wall that uses another principle for dispersing droplets that does not result merely from the fluid passing through the spray wall.

To achieve this object, the present invention proposes a fluid dispenser head including a spray wall that defines a central axis and that is perforated with holes through which the fluid under pressure passes so as to form jets of fluid, the holes extend along axes that correspond to the path of the jets of fluid, at least some of the axes intersect, such that the jets of fluid that extend along the intersecting axes meet at at least one collision point.

Thus, the dispersion of the fluid also results from the jets colliding, which jets may be formed by strings of droplets that are already fine or very fine. The droplets impacting against one another divides them into droplets that are even finer.

By way of indication, the number of holes may lie in the range 10 to 500, and the holes may present a diameter lying in the range about 1 μm to about 100 μm, advantageously in the range about 5 μm to about 30 μm, and preferably in the range about 5 μm to about 20 μm. The more holes there are, the smaller their diameter must be, and vice versa. The combined cross-section of all of the holes must be less than 100000 square micrometers ($\mu m^2$).

Advantageously, the spray wall defines a normal at each hole, the axes of the holes coinciding with their respective normals. In other words, each hole is perpendicular to the plane of the wall directly surrounding it. Or else, in the outer face of the spray wall, each hole is defined by an annular edge, advantageously a circular edge, that is inscribed in a plane: the axis of the hole being orthogonal to this plane.

According to another characteristic of the invention, the spray wall may be shaped, so that it is not completely plane. There may thus be one or more plane zones, together with one or more zones that are not plane, e.g. zones that are concave or convex, or even conical.

In another aspect, the holes may be aligned radially, at least in pairs (of holes), so that the jets coming from the radially-aligned holes meet at a collision point P. Preferably, the axes of the pairs of holes are inscribed in the orthogonal plane containing the central axis and their respective normals.

In a practical embodiment, the holes may be arranged in concentric circles that are situated respectively in zones that are concave and convex, in zones that are convex and plane, or in a single concave zone. In other words, one circle may be situated in a concave zone and the other circle in a plane zone, or one circle may be situated in a concave zone and the other circle in a convex zone, or both circles may be situated in a single concave zone. Other arrangements can also be envisaged.

The holes may be oriented so that the collision points co-operate with one another to form a ring or a focal point. All of the holes may converge towards a single focal collision point, or distinct collision points resulting from converging pairs of holes may co-operate with one another to form a focal ring.

Advantageously, the holes may present various diameters. By way of example, the holes that are situated closest to the central axis may present a diameter that is smaller than the diameter of the holes that are situated furthest from the central axis. Specifically, it has been observed that the droplets resulting from the collision diverge towards the side where the jet presents a slower speed. And the greater the diameter of the holes, the slower the speed of the droplets. It is thus appropriate to position the larger-diameter holes on the outside, furthest from the central axis, when it is desired to widen the angle of the spray. The inverse configuration can also be envisaged, in particular when a narrow spray angle is desired.

In a preferred embodiment, the holes are arranged in concentric circles, namely a small inner circle and a large outer circle, all of the holes of the small inner circle having the same diameter, and all of the holes of the large outer circle having the same diameter, the holes of the small inner circle presenting a diameter that is smaller than the diameter of the holes of the large outer circle. In this way, a wide spray is obtained with collision points arranged in a ring. The droplets resulting from the collisions are projected mainly outwards relative to the central axis.

In a practical embodiment that is conventional in the fields of perfumery, cosmetics, and sometimes pharmacy, the dispenser head comprises:

- an assembly housing; and
- a nozzle including a sleeve that is engaged in the assembly housing, the spray wall being secured to the sleeve.

The head may be in the form of a conventional pusher with a top bearing surface on which a user can press with a finger, e.g. the index finger. The axial housing thus opens out laterally. The nozzle may be force-fitted and/or snap-fastened and/or barb-connected in the axial housing.

The invention also defines a method of manufacturing a spray wall as defined above, the method comprising:

- perforating a plane strip with parallel perpendicular holes; and
- stamping the perforated plane strip so as to shape it in such a manner as to cause the axes of the holes (O1, O2) to cross.

With holes arranged in concentric circles, it suffices to form, in the strip, an angle that is less than 180° in order to cause the axes of the holes of one of the circles to pivot towards the axes of the holes of the other circle so that they intersect. The smaller the angle, the closer the collision points of the holes. An axial distance lying in the range about 1 millimeter (mm) to about 5 mm gives good results.

The spirit of the invention resides in creating a plurality of jet collisions with a spray wall that is perforated with 10 to 500 holes lying in the range 1 μm to 100 μm. A radial arrangement of holes, in particular in concentric circles, is particularly advantageous. Obtaining a single focal point is advantageous, since the probability of collision is optimized.

The invention is described more fully below with reference to the accompanying drawings which show several embodiments of the invention by way of non-limiting example.

Figure 3:
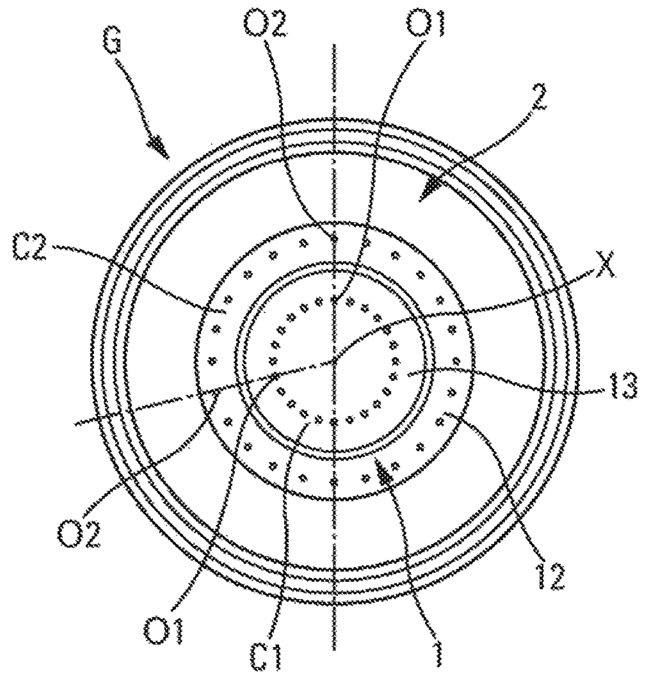
FIG. 3 is a front view of the FIG. 2 nozzle.
Figure 2:
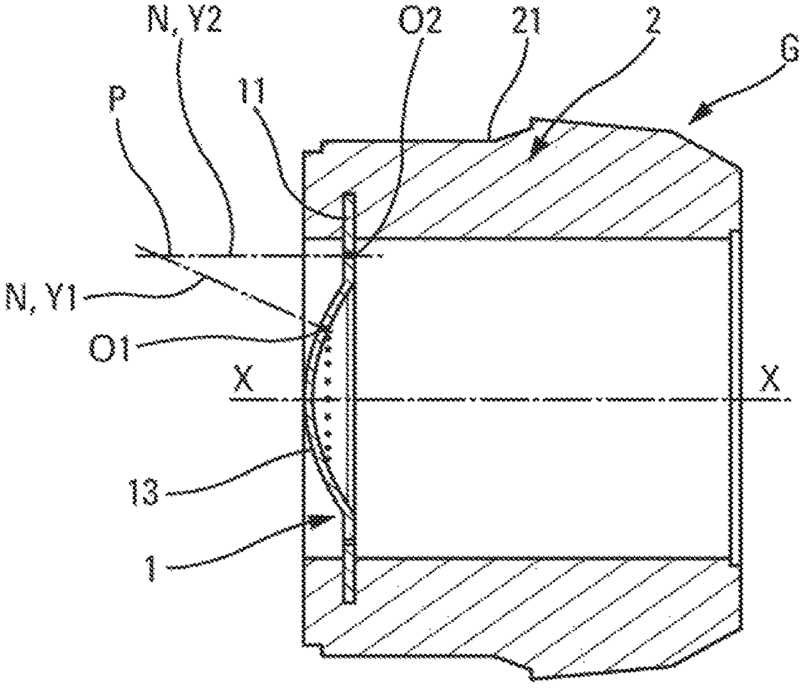
FIG. 2 is a much larger-scale section view of the nozzle of the FIG. 1 dispenser head.
Figure 5:
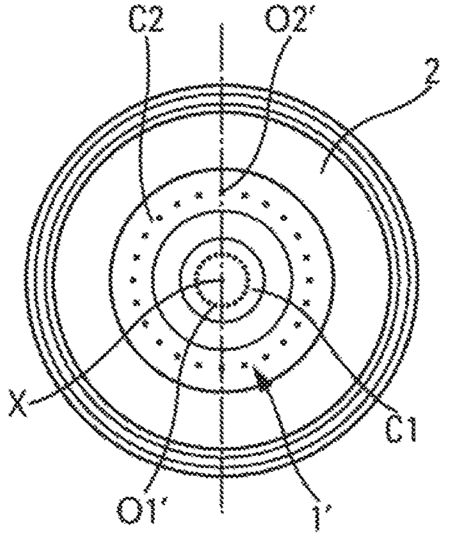
Figure 4:
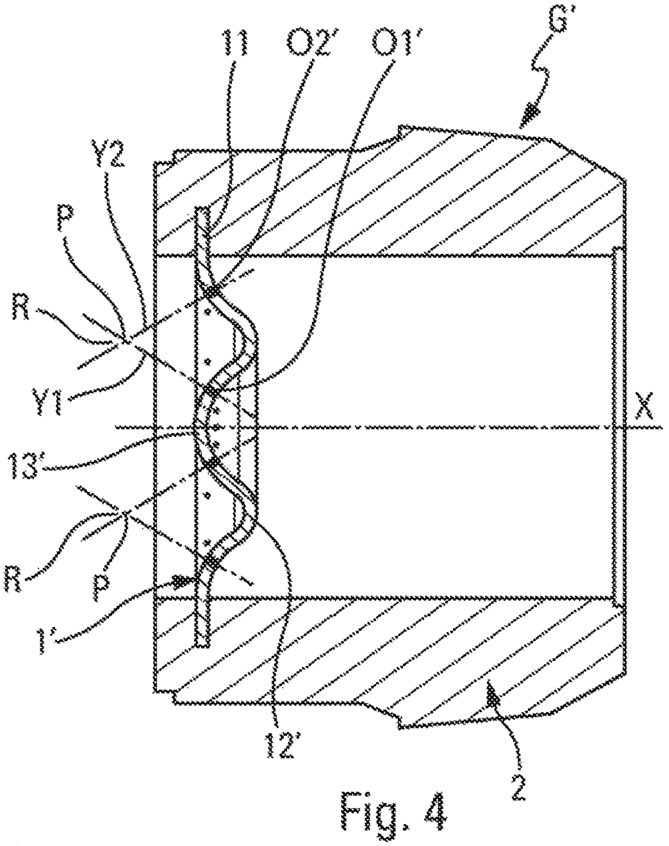
Figure 6:
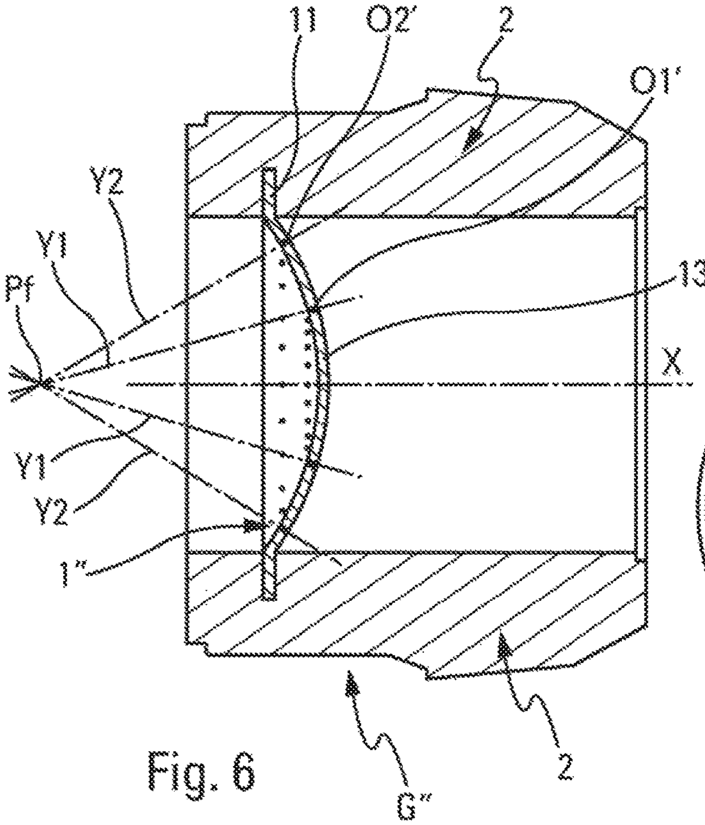
Figure 7:
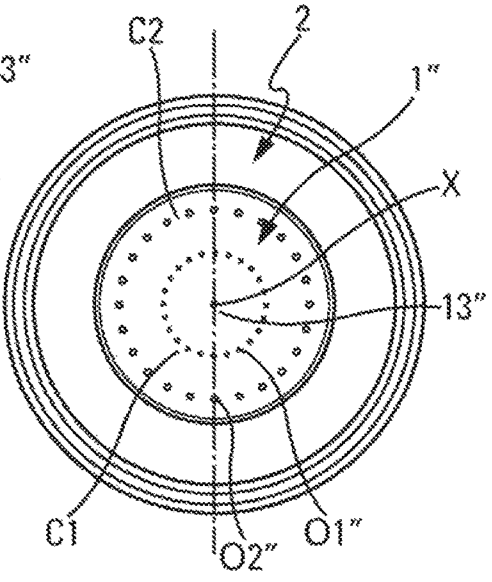

FIGS. 4 and 5 are views similar to the views in FIGS. 2 and 3 for a second embodiment of a nozzle of the invention; and FIGS. 6 and 7 are views similar to the views in FIGS. 2 and 3 for a third embodiment of a nozzle of the invention.

Figure 1:
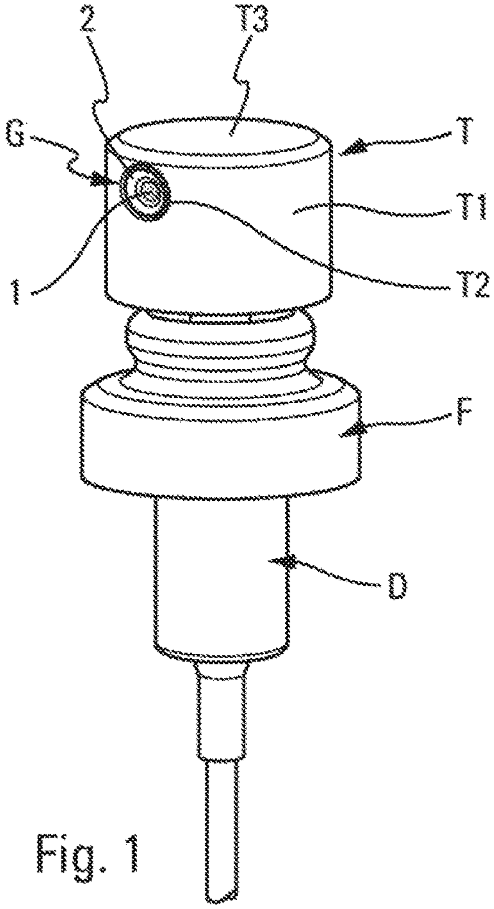
FIG. 1 is a perspective view of a pump fitted with a dispenser head of the invention.

In FIG. 1, the dispenser head T is mounted on a dispenser member D, such as a pump or a valve, that presents a design that is entirely conventional in the fields of perfumery and pharmacy. The dispenser member D is actuated by the user pressing axially on the head T with a finger, in general the index finger.

The dispenser member D is mounted on a fluid reservoir by means of a fastener ring F: thereby resulting in a fluid dispenser that is entirely manual, without requiring any supply of power, in particular of electrical power.

For a pump, the normal pressure generated by pressing axially on the fluid inside the pump P and the head T lies in the range about 5 bars to about 6 bars, and preferably in the range about 5.5 bars to about 6 bars. Peaks lying in the range 7 bars to 8 bars are nevertheless possible, but in conditions of use that are abnormal. Conversely, when approaching 2.5 bars, the spray is degraded, in the range 2.5 bars to 2.2 bars the spray is significantly degraded, and below 2 bars there is no longer any spray.

For an aerosol fitted with a valve, the initial pressure generated by the propellant gas lies in the range about 12 bars to about 13 bars and then drops to approximately 6 bars as the aerosol empties. An initial pressure of 10 bars is common in the fields of perfumery and cosmetics.

In comparison, in the technical field of ultrasonic-vibration spray devices (in particular piezoelectric spray devices), the pressure of the fluid at the nozzle is about 1 bar, i.e. atmospheric pressure, or a little less. Given the pressure values and the power used by such ultrasonic-vibration spray devices, they lie outside the scope of the invention.

Reference is made to FIGS. 1 to 3 in order to describe in detail the component parts of a dispenser head T made in accordance with the invention, and how they are arranged relative to one another.

The dispenser head T comprises two essential component elements, namely a head body T1 and a nozzle G. The head body T1 is preferably made as a single part: however, it could be made from a plurality of parts that are assembled together. The nozzle G may be made as a single part out of a single material, but it is preferably made by overmolding, as described below.

The head body T1 includes a connection sleeve that is mounted on the free end of an actuator rod of the dispenser member D. The head body T1 also includes a lateral assembly housing T2 in which the nozzle G is engaged. The head body T1 also defines a top bearing surface T3 on which a user can press by means of a finger.

In this embodiment, the dispenser head T is in the form of a pusher that is conventional in the fields of perfumery, cosmetics, and pharmacy.

The nozzle G presents a configuration that is generally substantially cylindrical, in the form of a small sleeve 2 that is closed by a spray wall 1 in which a plurality of spray holes or orifices O1, O2 are formed. More precisely, the sleeve 2 is of shape that is generally substantially cylindrical, and that is preferably axisymmetric about an axis X, as shown in FIGS. 2 and 3. The sleeve 2 is preferably overmolded on the spray wall 1. The nozzle G normally does not need to be oriented angularly, prior to being presented in front of the inlet of the axial assembly housing T2. The sleeve 2 forms an outer assembly wall 21 that is advantageously provided with fastener portions in relief that are suitable for co-operating with the assembly housing T2.

The spray wall 1 may be a single-piece part made of a single material, an assembly of a plurality of parts, or a multilayer structure, e.g. a laminate. It can be made of metal, e.g. stainless steel. More generally, any material that is suitable for being perforated with small holes or orifices can be used. The thickness of the spray wall 1 where the holes O1, O2 are formed lies in the range about 10 μm to about 100 μm, and is preferably about 50 μm. The number of holes O1, O2 may lie in the range about 10 to about 500. The diameter of the spray wall 1 where the holes are formed lies in the range about 0.5 mm to about 5 mm. In principle, the spray wall 1 has a thickness that is constant, but it is not entirely plane. The holes O1, O2 present a diameter lying in the range about 1 μm to about 100 μm, advantageously in the range about 5 μm to about 30 μm, and preferably in the range about 5 μm to about 20 μm.

In FIG. 2, it can be seen that the spray wall 1 includes an outer annular peripheral area 11 having an outer portion that is embedded in the sleeve 2. The peripheral area 11 is also perforated with a first series of holes O2 that are arranged in a circle C2 around the axis X. The holes O2 present an orientation that extends along axes Y2 that are perpendicular to the peripheral area 11. It can also be said that, at each hole O2, the peripheral area 11 defines a normal N that is perpendicular to the plane of the peripheral area 11. The axes Y2 of the holes O2 coincide with their respective normals. Thus, the axes Y2 are all parallel to one another, and they are also parallel to the axis X. The distance between the axes Y2 and the axis X is identical, given that the axes Y2 extend in a circle around the axis X.

The spray wall 1 also includes a dome-shaped zone 13 that is centered on the axis X. The dome-shaped zone is convex on the outside. The dome-shaped zone 13 may define curvature that corresponds to the curvature of a circle, having a center that is positioned on the axis X. The dome-shaped zone 13 is perforated with a second series of holes O1 that are also arranged in a circle C1 around the axis X. Consequently, the holes O1 are arranged in concentric manner inside the circle of holes O2. The holes O1 extend along respective axes Y1 that also coincide with their respective normals N. It can thus be said that the holes O1 are also formed perpendicularly to the spray wall 1. In FIG. 2, it can be seen that each axis Y1 extends in diverging manner relative to the axis X, such that the axes Y1 and Y2 intersect at a collision point P. In order to guarantee that the jet of fluid coming from a hole O1 meets the jet of fluid coming from a hole O2, the holes O1 and O2 are arranged so as to be aligned in pairs along radii starting from the central axis X. In this way, it is guaranteed that the axes Y1 and Y2 are inscribed in an orthogonal plane that contains the axis X and the two normals N of the pair of aligned holes O1 and O2. The orthogonal plane is the plane of the sheet for FIG. 2. Thus, with a spray wall 1 perforated with two concentric circles C1 and C2 each having twenty four holes, twenty four collision points P are obtained that co-operate with one another to form a ring R having a diameter that is identical to the diameter of the circle C2 of the holes O2. The distance between the ring R and the peripheral area 11 depends on the greater or lesser divergence of the axes Y1, and on the spacing between the holes O1 and O2.

In this embodiment, the holes O1 and O2 may be identical in diameter. In a variant, the diameter of the holes O1 of the small circle C1 is smaller than the diameter of the holes O2 of the large circle C2.

FIGS. 4 and 5 show a second embodiment for a spray wall 1' that is perforated with concentric holes O1' and O2' that are centered on the central axis X. As in the first embodiment, the holes O1' and O2' extend along respective axes Y1 and Y2 that coincide with their respective normals N. As can be seen in FIG. 4, the spray wall 1' also includes a peripheral area 11 that is embedded in the sleeve 2. The wall 1' includes an annular groove 12' that extends towards the inside of the sleeve 2. At the center, the wall 1' forms a central boss 13' that is centered on the axis X. The holes O1' and O2' are arranged in the two facing flanks of the annular groove 12', so that the axes Y1 and Y2 converge in such a manner as to cross at collision points P. Once again, the holes O1' and O2' are aligned radially in pairs. The holes O1' may present a diameter that is greater than the diameter of the holes O2'.

FIGS. 6 and 7 show a third embodiment for a spray wall 1" that comprises a peripheral area 11 and a concave dome-shaped zone 13" that is centered on the axis X. In the same manner as the dome-shaped zone 13 in FIG. 2 can be said to be "convex", the zone 13" can be said to be "concave". The concave zone 13" is perforated with two series of holes O1" and O2", still arranged in concentric circles C1 and C2. As a result of the concave shape of the zone 13", the axes Y1 and Y2 of the holes O1' and O2' converge towards the axis X, and they all meet at a focal collision point Pf, which is itself situated on the axis X. The holes O1" present a diameter that is smaller than the diameter of the holes O2". Although the holes O1" and O2" may be aligned radially in pairs, as in the first and second embodiments, such alignment is not essential in this embodiment, given that all of the axes Y1 and Y2 all converge towards a single focal collision point Pf. The advantage of this embodiment resides in the fact that a jet coming from any hole has a very high probability of meeting another jet coming from another hole, given that there are forty eight jets that are all directed at a single point Pf. This embodiment can thus be considered as a preferred embodiment.

The spray walls of the three embodiments described above can be made using a manufacturing method in which a plane strip is initially perforated with parallel perpendicular holes. The holes may differ in diameter only. Thereafter, the perforated plane strip is stamped so as to shape it in such a manner as to cause the axes Y1, Y2 of the holes O1, O2 to cross, in pairs as in the first and second embodiments so as to form a ring R, or at a single focal point Pf, as in the third embodiment. In a variant, it is also possible to perforate initially-sloping holes in a plane strip, or, on the contrary, to perforate parallel holes in a bent or dome-shaped strip.

Whatever the manufacturing method used, the invention enables a spray wall to be obtained with multiple micro-holes, from which the dispersion of the droplets is determined firstly by the size of the micro-holes, and secondly by the collisions between the jets coming from the converging holes.

The total number of holes, the arrangement of the holes in the spray wall, the number of holes per circle, the orientation of the holes, and the diameter of the holes are all parameters that have an influence on the characteristics of the spray. The parameters should be determined as a function of the fluid to be sprayed and of the functions that are desired.

The invention claimed is:

1. A fluid dispenser head (T) including a spray wall (1; 1', 1") that defines a central axis (X) and that is perforated with holes (O1, O2; O1', O2'; O1", O2") through which the fluid under pressure passes so as to form jets of fluid, the holes (O1, O2; O1', O2'; O1", O2") extend along axes (Y1, Y2) that correspond to the path of the jets of fluid, at least some of the axes (Y1, Y2) intersecting, such that the jets of fluid that extend along the intersecting axes (Y1, Y2) meet at at least one collision point (P; Pf);

wherein the holes (O1, O2; O1', O2'; O1", O2") present various diameters; and wherein the spray wall defines a normal at each hole, the axes of the holes coinciding with their respective normals; and wherein the holes situated closest to the central axis present a diameter that is smaller than the diameter of the holes situated furthest from the central axis.

2. A dispenser head according to claim 1, wherein the number of holes (O1, 2; O1', O2'; O1", O2") lies in the range 10 to 500, and the holes present a diameter lying in the range about 1 μm to about 100 μm.

3. A dispenser head according to claim 2, wherein the holes present a diameter lying in the range of about 5 μm to about 30 μm.

4. A dispenser head according to claim 2, wherein the holes present a diameter lying in the range of about 5 μm to about 20 μm.

5. A dispenser head according to claim 1, wherein the spray wall is shaped, so that it is not completely plane.

6. A dispenser head according to claim 1, wherein the holes (O1, O2; O1', O2'; O1", O2") are aligned radially, at least in pairs of holes, so that the jets coming from the radially-aligned holes meet at a collision point P.

7. A dispenser head according to claim 1, wherein the holes (O1, O2; O1', O2'; O1", O2") are arranged in concentric circles (C1, C2) that are situated respectively in zones that are concave and convex, in zones that are convex and plane, or in a single concave zone.

8. A dispenser head according to claim 1, configured such that the jets of fluid form a plurality of collision points (P) that co-operate with one another to form a ring (R) or converge on a single focal point (Pf).

9. A fluid dispenser comprising a fluid dispenser head (T) according to claim 1 that is mounted on a pump (D) or a valve, which is itself mounted on a fluid reservoir.

10. A method of manufacturing a spray wall (26) according to claim 1, the method comprising:

perforating a plane strip with parallel holes (O) that are perpendicular to the plane strip; and stamping the perforated plane strip so as to shape it in such a manner as to cause the axes (Y1, Y2) of the holes (O1, O2; O1', O2'; O1", O2") to cross.

11. A fluid dispenser head including a spray wall that defines a central axis and that is perforated with holes through which the fluid under pressure passes so as to form jets of fluid, the holes extend along axes that correspond to the path of the jets of fluid, at least some of the axes intersecting, such that the jets of fluid that extend along the intersecting axes meet at at least one collision point;

wherein the holes present various diameters; and wherein the spray wall defines a normal at each hole, the axes of the holes coinciding with their respective normal; and wherein the holes (O1, O2; O1', O2'; O1", O2") are arranged in concentric circles (C1, C2), namely a small inner circle C1 and a large outer circle (C2), all of the holes (O1; O1'; O1") of the small inner circle (C1) having the same diameter, and all of the holes (O2; O2'; O2") of the large outer circle (C2) having the same diameter, the holes (O1; O1'; O1") of the small inner circle (C1) presenting a diameter that is smaller than the diameter of the holes (O2; O2'; O2") of the large outer circle (C2).

12. A fluid dispenser head including a spray wall that defines a central axis and that is perforated with holes through which the fluid under pressure passes so as to form jets of fluid, the holes extend along axes that correspond to the path of the jets of fluid, at least some of the axes intersecting, such that the jets of fluid that extend along the intersecting axes meet at at least one collision point;

wherein the holes present various diameters; and wherein the spray wall defines a normal at each hole, the axes of the holes coinciding with their respective normal;

the fluid dispenser device further comprising:

an assembly housing (T2); and a nozzle (G; G'; G") including a sleeve (2) that is engaged in the assembly housing (T2), the spray wall (1; 1'; 1") being secured to the sleeve (2).

* * * * *